(12) United States Patent
Akihisa et al.

(10) Patent No.: US 8,356,582 B2
(45) Date of Patent: Jan. 22, 2013

(54) SPARK IGNITION TYPE INTERNAL COMBUSTION ENGINE

(75) Inventors: Daisuke Akihisa, Susono (JP); Daisaku Sawada, Gotenba (JP); Eiichi Kamiyama, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 448 days.

(21) Appl. No.: 12/672,143

(22) PCT Filed: Aug. 12, 2008

(86) PCT No.: PCT/JP2008/064680
§ 371 (c)(1), (2), (4) Date: Feb. 4, 2010

(87) PCT Pub. No.: WO2009/022751
PCT Pub. Date: Feb. 19, 2009

(65) Prior Publication Data
US 2010/0206271 A1    Aug. 19, 2010

(30) Foreign Application Priority Data
Aug. 13, 2007  (JP) ................................ 2007-211025

(51) Int. Cl.
*F02B 75/04* (2006.01)
(52) U.S. Cl. .................. 123/48 C; 123/90.15; 123/78 C
(58) Field of Classification Search ................ 123/48 R, 123/48 B, 78 R, 78 A, 78 AA, 78 B, 78 BA, 123/78 C, 78 E, 78 F, 90.15
See application file for complete search history.

(56) References Cited

U.S. PATENT DOCUMENTS

| | | | | |
|---|---|---|---|---|
| 4,174,683 A * | 11/1979 | Vivian | ......................... | 123/48 C |
| 5,322,044 A * | 6/1994 | Maebashi | ...................... | 123/305 |
| 5,367,998 A * | 11/1994 | Shiohara et al. | ............... | 123/457 |
| 5,400,755 A * | 3/1995 | Maebashi | ................ | 123/339.22 |
| 6,481,394 B1 * | 11/2002 | Hiki | ......................... | 123/65 P E |
| 6,691,655 B2 * | 2/2004 | Aoyama et al. | ............ | 123/90.16 |
| 7,191,589 B2 * | 3/2007 | Yasui et al. | ..................... | 60/284 |
| 7,334,547 B2 * | 2/2008 | Hiraya et al. | ............... | 123/48 R |
| 2002/0092488 A1 * | 7/2002 | Aoyama et al. | ............ | 123/90.16 |

(Continued)

FOREIGN PATENT DOCUMENTS

| | | |
|---|---|---|
| JP | A-2001-263099 | 9/2001 |
| JP | A-2003-232233 | 8/2003 |

(Continued)

OTHER PUBLICATIONS

International Search Report issued in International Application No. PCT/JP2008/064680 on Sep. 9. 2008.

*Primary Examiner* — Noah Kamen
*Assistant Examiner* — Hung Q Nguyen
(74) *Attorney, Agent, or Firm* — Oliff & Berridge, PLC

(57) ABSTRACT

A spark ignition internal combustion engine includes a variable expansion ratio mechanism which can alter the mechanical expansion ratio, and an exhaust variable valve mechanism which can alter the timing for opening an exhaust valve. The mechanical expansion ratio and the timing for opening the exhaust valve are set depending on the engine load such that the mechanical expansion ratio increases and the timing for opening the exhaust valve is retarded to the exhaust bottom dead center side as the engine load decreases. By setting the mechanical expansion ratio in such a manner depending on the engine load, thermal efficiency can be enhanced as compared with a case where the mechanical expansion ratio is set to make the actual compression rate constant for example. Consequently, a spark ignition internal combustion engine exhibiting high thermal efficiency is provided.

6 Claims, 13 Drawing Sheets

U.S. PATENT DOCUMENTS

2003/0106542 A1  6/2003  Aoyama et al.
2007/0209630 A1* 9/2007  Hiraya et al. .............. 123/197.4

FOREIGN PATENT DOCUMENTS

| JP | A-2003-314315 | 11/2003 |
| JP | A-2004-218522 | 8/2004 |
| JP | A-2004-239174 | 8/2004 |
| JP | A-2005-90299 | 4/2005 |
| JP | A-2006-177176 | 7/2006 |
| JP | A-2007-56796 | 3/2007 |
| JP | A-2007-71046 | 3/2007 |
| JP | A-2007-92610 | 4/2007 |

* cited by examiner

Fig.1
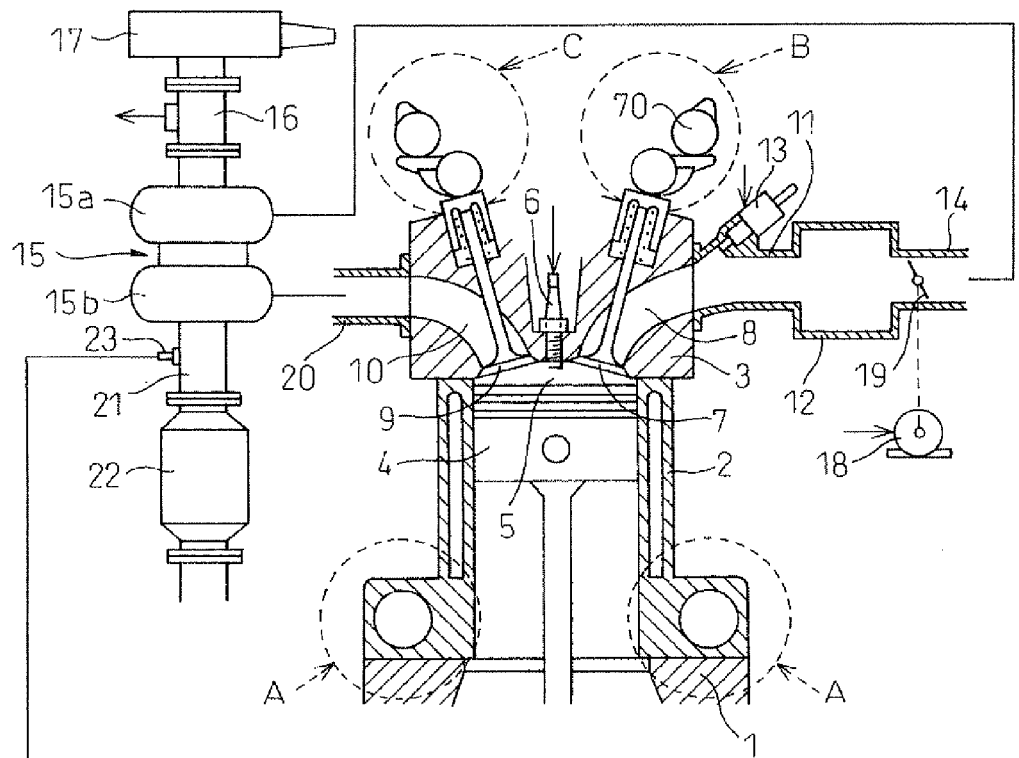
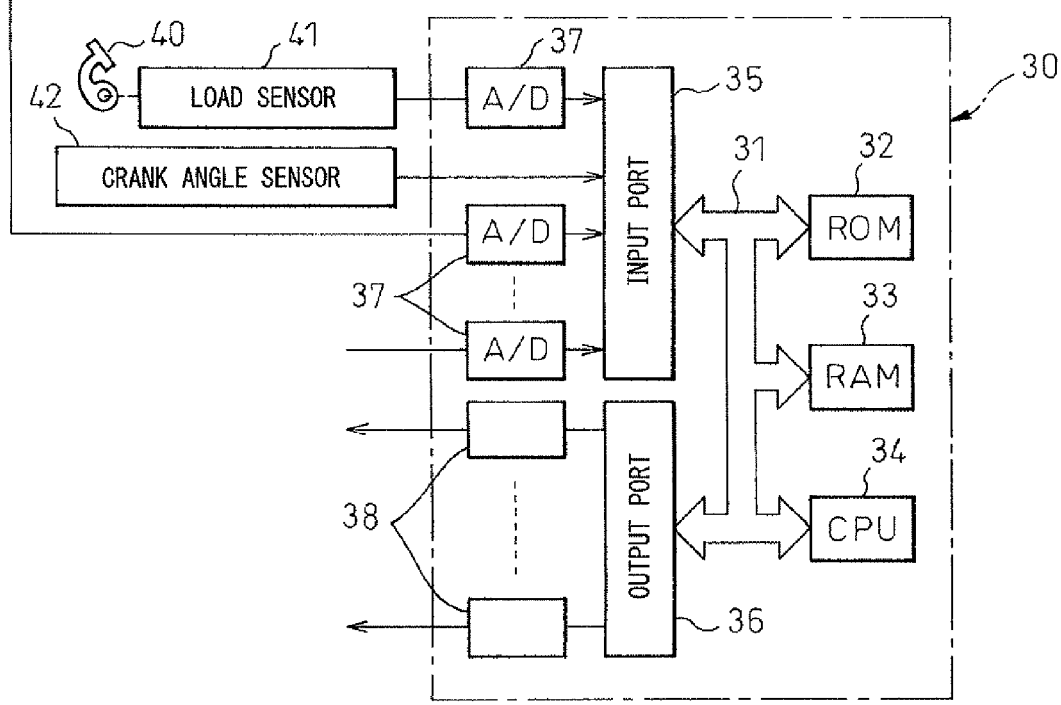

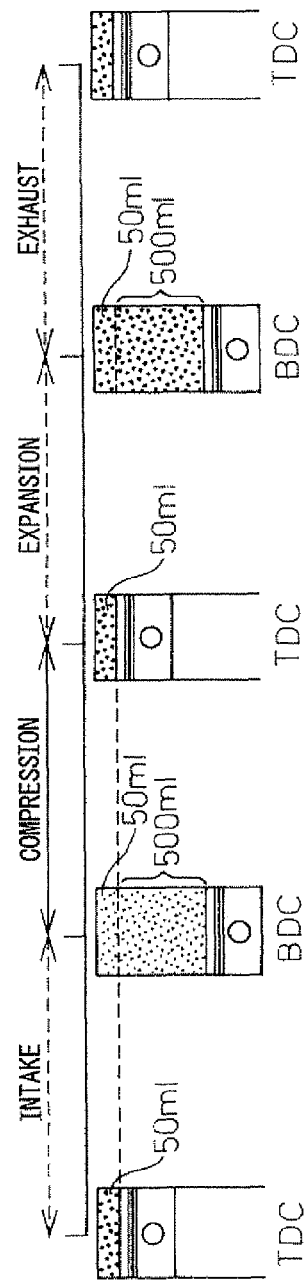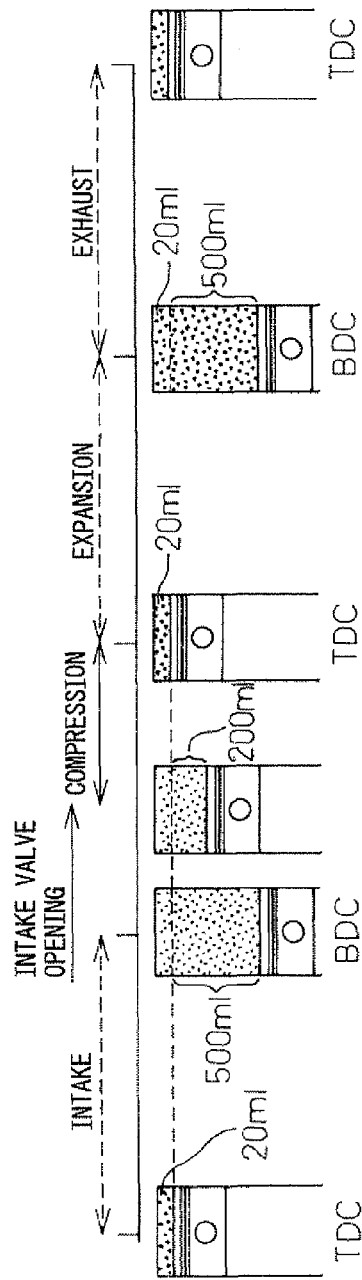

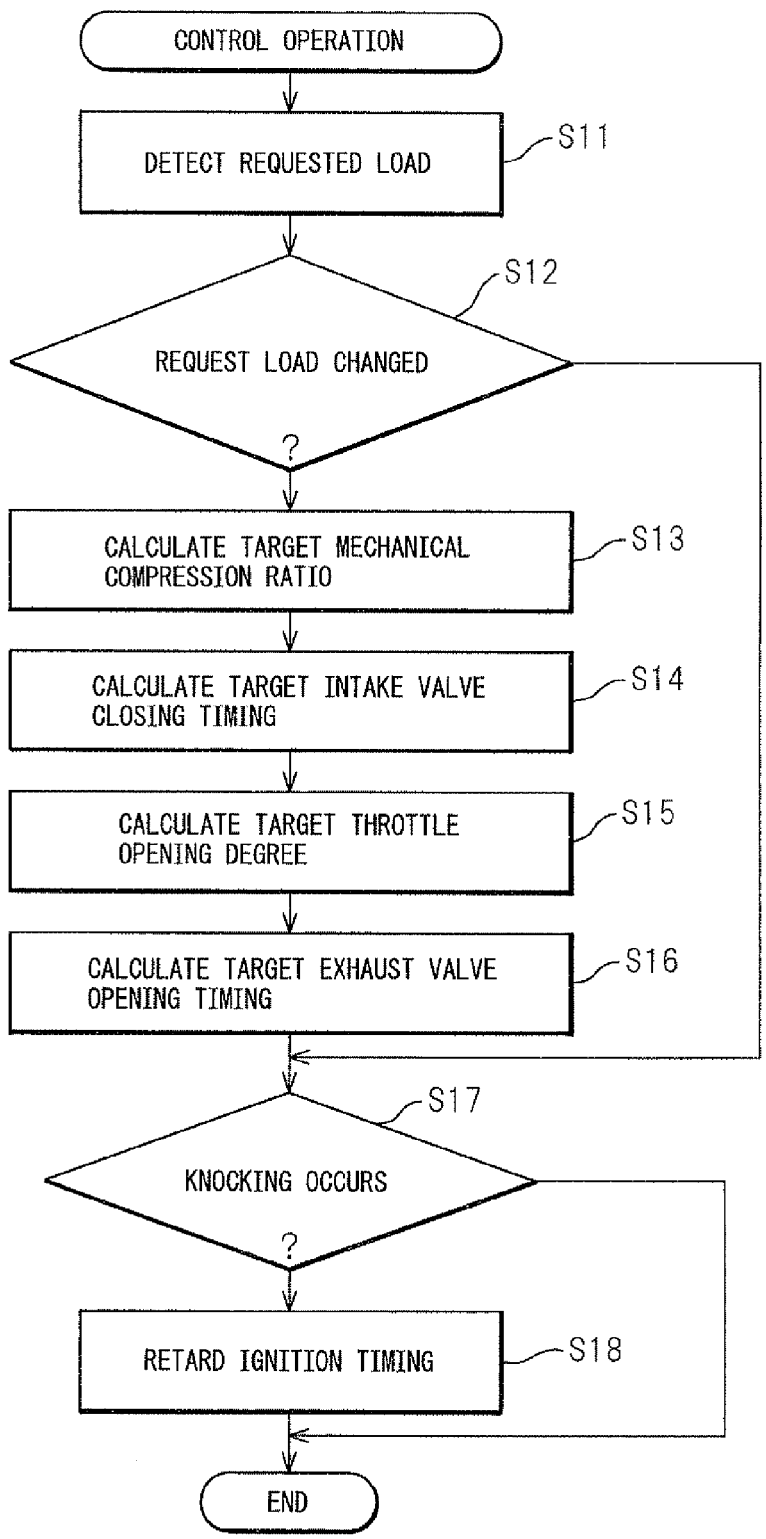

SPARK IGNITION TYPE INTERNAL COMBUSTION ENGINE

TECHNICAL FIELD

The present invention relates to a spark ignition type internal combustion engine.

BACKGROUND ART

Known in the art is a spark ignition type internal combustion engine provided with a variable compression ratio mechanism able to change a mechanical compression ratio and a variable valve mechanism able to control a closing timing of an intake valve, performing a supercharging action by a supercharger at the time of engine medium load operation and engine high load operation, and increasing the mechanical compression ratio and retarding the closing timing of the intake valve as the engine load becomes lower in the state holding an actual compression ratio constant at the time of engine medium and high load operation (for example, see Japanese Patent Publication (A) No. 2004-218522).

According to such a spark ignition type internal combustion engine, at the time of engine medium load operation, the mechanical compression ratio rises and the closing timing of the intake valve is retarded, so the fuel consumption at the time of engine medium load operation improves, whereas at the time of engine high load operation, the mechanical compression ratio drops and the closing timing of the intake valve is advanced, so the output torque at the time of engine high load operation increases.

However, in such a spark ignition type internal combustion engine, the variable compression ratio mechanism and variable valve mechanism are controlled in a way that keeps the actual compression ratio constant. Specifically, a closing timing of the intake valve is determined to make the intake air amount correspond to the amount of engine load, and then a mechanical compression ratio is determined based on the determined closing timing of the intake valve to make the actual compression ratio constant.

However, such a control method cannot sufficiently improve thermal efficiency. That is, in order to increase the thermal efficiency, it is necessary to increase the mechanical expansion ratio (equivalent to the mechanical compression ratio) as much as possible. However, under the above control method, the mechanical expansion ratio is determined in a dependent manner in accordance with the closing timing etc. of the intake valve determined first, so the mechanical expansion ratio is not necessarily set as much as possible.

DISCLOSURE OF THE INVENTION

The present invention was made considering the above problems and has as its object to provide a spark ignition type internal combustion engine with a high thermal efficiency.

The present invention provides a spark ignition type internal combustion engine set forth in the claims as a means for solving the above problem.

In a first aspect of the present invention, the engine is provided with a variable expansion ratio mechanism able to change a mechanical expansion ratio and an exhaust variable valve mechanism able to change an opening timing of an exhaust valve and sets the mechanical expansion ratio and the opening timing of the exhaust valve according to an engine load so that as the engine load becomes lower, the higher the mechanical expansion ratio and the more retarded the opening timing of the exhaust valve to an exhaust bottom dead center side.

Here, the thermal efficiency can be increased by raising the actual expansion ratio, that is, by raising the mechanical expansion ratio and retarding the opening timing of the exhaust valve to the exhaust bottom dead center side. However, if the mechanical expansion ratio increases, the amount of intake air decreases, while if the opening timing of the exhaust valve is retarded to the exhaust bottom dead center side, the discharge of exhaust gas worsens. Therefore, at the time of engine high load operation, if the actual expansion ratio is increased, a sufficient engine output cannot be obtained.

As opposed to this, according to this above aspect, the mechanical expansion ratio and the opening timing of the exhaust valve are set according to the engine load. Therefore, at the time of engine low load operation, the actual expansion ratio is increased so as to increase the thermal efficiency, while on the other hand, at the time of engine high load operation, the actual expansion ratio can be kept low so as to obtain a sufficient engine output. Therefore, a sufficient engine output can be obtained while thermal efficiency can be increased.

In particular, according to the above aspect, because the mechanical expansion ratio is set according to the engine load, the thermal efficiency can be increased in comparison to setting the mechanical expression ratio to make the actual compression ratio constant.

In a second aspect of the present invention, the maximum value of the mechanical expansion ratio is 20 or more.

In a third aspect of the present invention, when the actual engine load is less than a reference load, the mechanical expansion ratio is controlled to be substantially constant.

In a fourth aspect of the present invention, the above reference load is the engine load when the mechanical expansion ratio is maximum.

In a fifth aspect of the present invention, the engine is further provided with an intake variable valve mechanism able to change the closing timing of the intake valve, and moves the closing timing of the intake valve further in a direction away from the intake bottom dead center the less the engine load.

In a sixth aspect of the present invention, the engine retards the ignition timing when knocking occurs.

According to the present invention, the thermal efficiency can be increased in comparison to when, for example, setting the mechanical expansion ratio so as to make the actual compression ratio constant.

The present invention can be sufficiently understood from the attached drawings and the description of the preferred embodiments of the present invention.

BRIEF DESCRIPTION OF THE DRAWINGS

FIG. 1 is an overall view of a spark ignition type internal combustion engine.

FIG. 9A and FIG. 9B are views explaining an ordinary cycle and superhigh expansion ratio cycle.

FIG. 13 is a flowchart showing a control routine for operational control of an internal combustion engine.

BEST MODE FOR CARRYING OUT THE INVENTION

Figure 2:
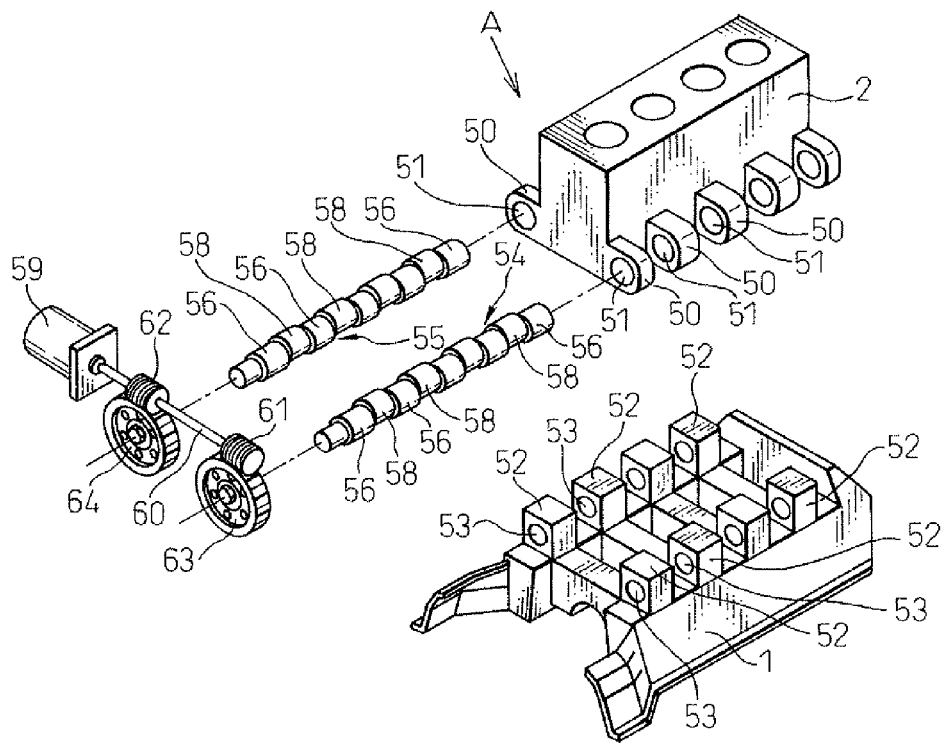
FIG. 2 is an exploded perspective view of a variable compression ratio mechanism.

Below, embodiments of the present invention will be explained with reference to the drawings. Note that the same or similar components in the drawings are assigned the same notations. FIG. 1 is a side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. The intake port 8 is connected through an intake branch tube 11 to a surge tank 12, while each intake branch tube 11 is provided with a fuel injector 13 for injecting fuel toward a corresponding intake port 8. Note that each fuel injector 13 may be arranged at each combustion chamber 5 instead of being attached to each intake branch tube 11.

The surge tank 12 is connected through an intake duct 14 to an outlet of the compressor 15a of the exhaust turbocharger 15, while an inlet of the compressor 15a is connected through an intake air amount detector 16 using for example a hot wire to an air cleaner 17. The intake duct 14 is provided inside it with a throttle valve 19 driven by an actuator 18.

On the other hand, the exhaust port 10 is connected through an exhaust manifold 20 to an inlet of an exhaust turbine 15b of the exhaust turbocharger 15, while an outlet of the exhaust turbine 15b is connected through an exhaust pipe 21 to a catalytic converter 24 housing an exhaust gas purification catalyst. The exhaust manifold 21 is provided inside it with an air-fuel ratio sensor 23.

Further, in the embodiment shown in FIG. 1, the connecting part of the crank case 1 and the cylinder block 2 is provided with a variable compression ratio mechanism A able to change the relative positions of the crank case 1 and cylinder block 2 in the cylinder axial direction so as to change the volume of the combustion chamber 5 when the piston 4 is positioned at compression top dead center. The internal combustion engine is further provided with intake variable valve mechanism B able to change the operating conditions of the intake valve 7, and exhaust variable valve mechanism C able to change the operating conditions of the exhaust valve 9.

The electronic control unit 30 is comprised of a digital computer provided with components connected with each other through a bidirectional bus 31 such as a ROM (read only memory) 32, RAM (random access memory) 33, CPU (microprocessor) 34, input port 35, and output port 36. The output signal of the intake air amount detector 16 and the output signal of the air-fuel ratio sensor 23 are input through corresponding AD converters 37 to the input port 35. Further, the accelerator pedal 40 is connected to a load sensor 41 generating an output voltage proportional to the amount of depression of the accelerator pedal 40. The output voltage of the load sensor 41 is input through a corresponding AD converter 37 to the input port 35. Further, the input port 35 is connected to a crank angle sensor 42 generating an output pulse every time the crankshaft rotates by for example 30°. On the other hand, the output port 36 is connected through the corresponding drive circuits 38 to a spark plug 6, fuel injector 13, throttle valve drive actuator 18, and variable compression ratio mechanism A.

Figures 3A, 3B:
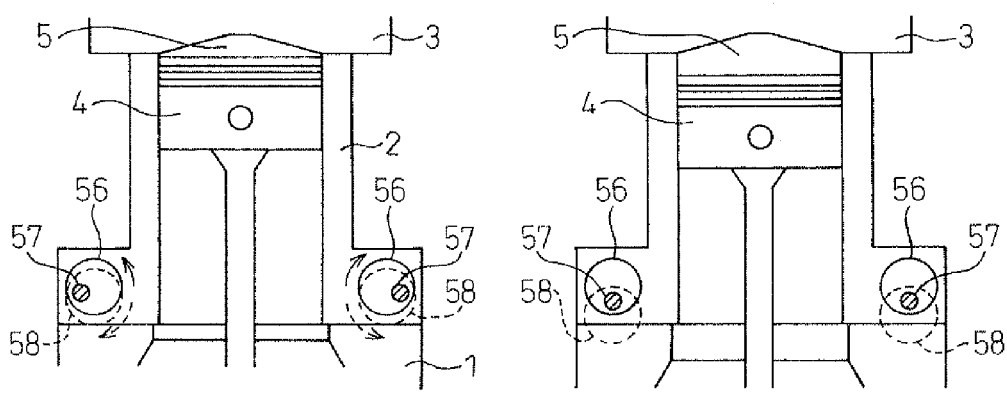
FIG. 3A and FIG. 3B are side cross-sectional views of an internal combustion engine schematically illustrated.

FIG. 2 is an exploded perspective view of the variable compression ratio mechanism A shown in FIG. 1, while FIG. 3A and FIG. 3B are side cross-sectional views of the internal combustion engine schematically illustrated. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 is provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, between the circular cams 56, as shown by the hatching in FIG. 3A and FIG. 3B, extend eccentric shafts 57 arranged eccentrically with respect to the axes of rotation of the cam shafts 54, 55. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 fastened to the cam shafts 54, 55 are rotated in opposite directions as shown by the solid line arrows in FIG. 3A from the state shown in FIG. 3A, the eccentric shafts 57 move toward the bottom center, so the circular cams 58 rotate in the opposite directions from the circular cams 56 in the cam insertion holes 53 as shown by the broken line arrows in FIG. 3A. As shown in FIG. 3(B), when the eccentric shafts 57 move toward the bottom center, the centers of the circular cams 58 move to below the eccentric shafts 57.

As will be understood from a comparison of FIG. 3A and FIG. 3B, the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 moves away from the crank case 1, the volume of the combustion chamber 5 when the piston 4 is positioned at compression top dead center increases, therefore by making the cam shafts 54, 55 rotate, the volume of the combustion chamber 5 when the piston 4 is positioned at compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55. In this embodiment, the drive motor 59 may be driven to change the volume of the combustion chamber 5 when the piston 4 is positioned at compression top dead center over a broad range. Note that the variable compression ratio mechanism A shown from FIG. 1 to FIG. 3 shows an example. Any type of variable compression ratio mechanism may be used.

Figure 4:
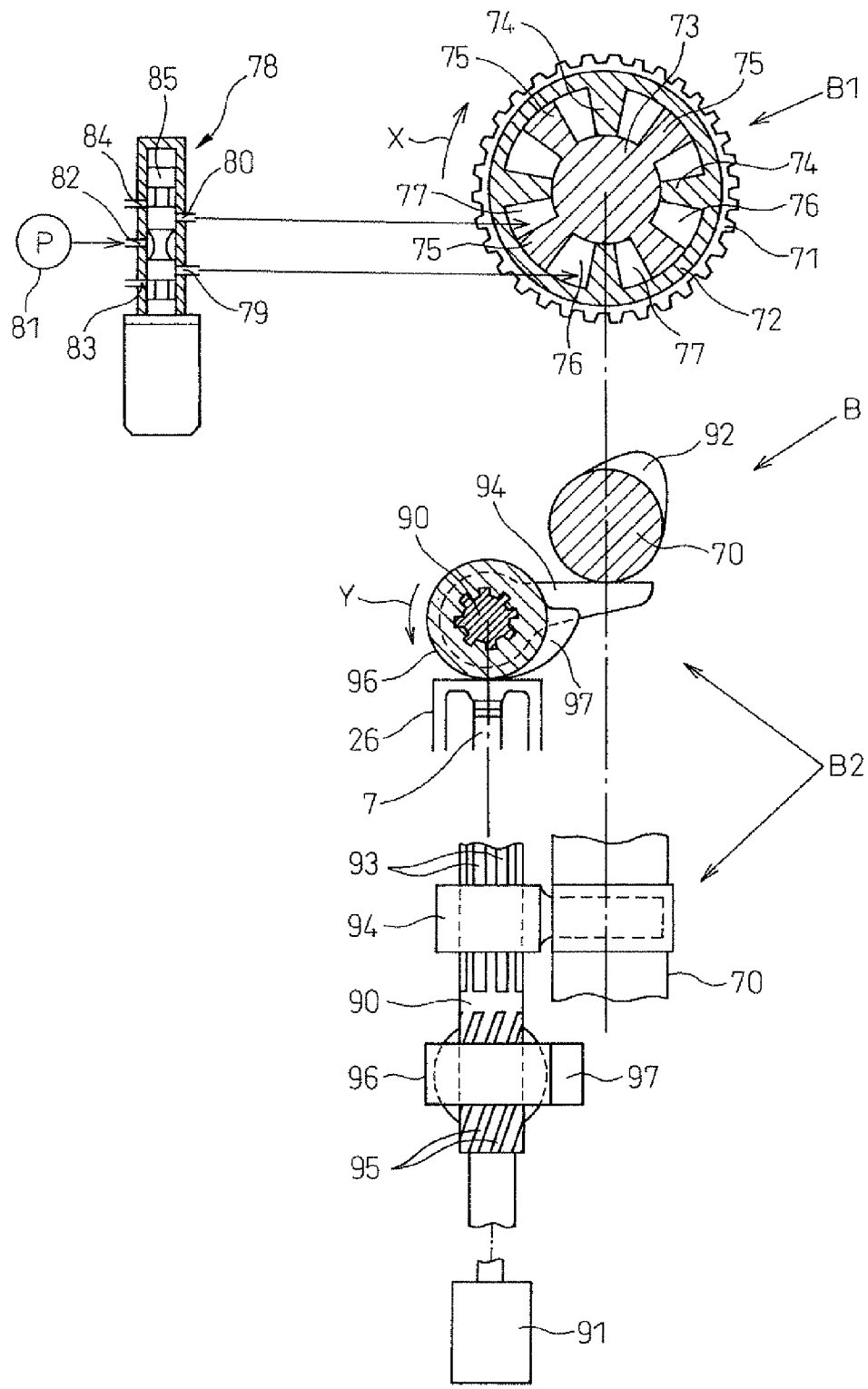
FIG. 4 is a view showing a variable valve mechanism.

On the other hand, further, FIG. 4 shows an intake valve variable mechanism B attached to the cam shaft 70 for driving the intake valve 7 in FIG. 1. As shown in FIG. 4, the intake variable valve mechanism B is comprised of a cam phase changer B1 attached to one end of the cam shaft 70 and changing the phase of the cam of the cam shaft 70, and a cam actuation angle changer B2 arranged between the cam shaft 70 and the valve lifter 26 of the intake valve 7 and changing the actuation angle (working angle) of the cams of the cam shaft 70 to different actuation angles for transmission to the intake valve 7. Note that FIG. 4 is a side sectional view and plan view of the cam actuation angle changer B2.

First, explaining the cam phase changer B1 of the intake variable valve mechanism B, this cam phase changer B1 is provided with a timing pulley 71 made to rotate by an engine crank shaft through a timing belt in the arrow direction, a cylindrical housing 72 rotating together with the timing pulley 71, a rotation shaft 73 able to rotate together with a cam shaft 70 and rotate relative to the cylindrical housing 72, a plurality of partitions 74 extending from an inside circumference of the cylindrical housing 72 to an outside circumference of the rotation shaft 73, and vanes 75 extending between the partitions 74 from the outside circumference of the rotation shaft 73 to the inside circumference of the cylindrical housing 72, the two sides of the vanes 75 formed with advancing use hydraulic chambers 76 and retarding use hydraulic chambers 77.

The feed of working oil to the hydraulic chambers 76, 77 is controlled by a working oil feed control valve 78. This working oil feed control valve 78 is provided with hydraulic ports 79, 80 connected to the hydraulic chambers 76, 77, a feed port 82 for feeding working oil discharged from a hydraulic pump 81, a pair of drain ports 83, 84, and a spool valve 85 for controlling connection and disconnection of the ports 79, 80, 82, 83, 84.

To advance the phase of the cams of the cam shaft 70, the spool valve 85 is made to move to downward in FIG. 4, working oil fed from the feed port 82 is fed through the hydraulic port 79 to the advancing use hydraulic chambers 76, and working oil in the retarding use hydraulic chambers 77 is drained from the drain port 84. At this time, the rotation shaft 73 is made to rotate relative to the cylindrical housing 72 in the arrow X-direction.

As opposed to this, to retard the phase of the cam of the cam shaft 70, the spool valve 85 is made to move upward in FIG. 4, working oil fed from the feed port 82 is fed through the hydraulic port 80 to the retarding use hydraulic chambers 77, and working oil in the advancing use hydraulic chambers 76 is drained from the drain port 83. At this time, the rotation shaft 73 is made to rotate relative to the cylindrical housing 72 in the direction opposite to the arrows X.

Figure 5A:
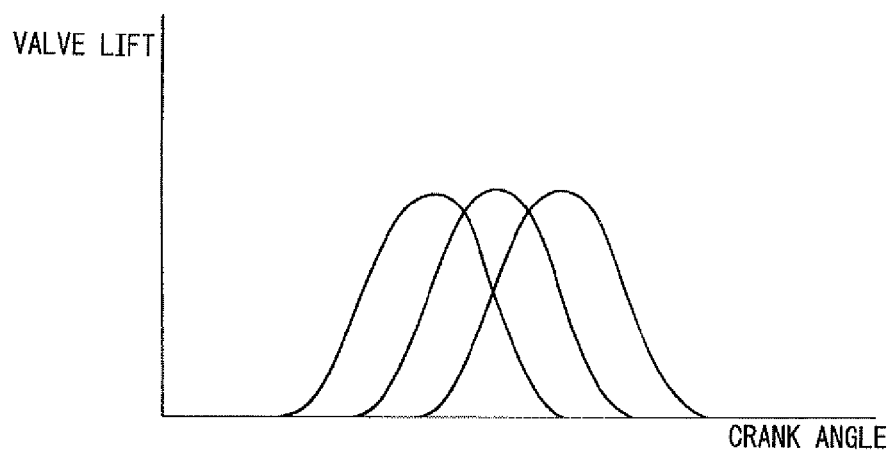
FIG. 5A and FIG. 5B are views showing an amount of lift of an intake valve.

When the rotation shaft 73 is made to rotate relative to the cylindrical housing 72, if the spool valve 85 is returned to the neutral position shown in FIG. 4, the operation for relative rotation of the rotation shaft 73 is ended, and the rotation shaft 73 is held at the relative rotational position at that time. Therefore, it is possible to use the cam phase changer B1 so as to advance or retard the phase of the cam of the cam shaft 70 by exactly the desired amount as shown in FIG. 5A. That is, the cam phase changer B1 can freely advance or retard the opening timing of the intake valve 7.

Next, explaining the cam actuation angle changer B2 of the variable valve timing mechanism B, this cam actuation angle changer B2 is provided with a control rod 90 arranged in parallel with the cam shaft 70 and made to move by an actuator 91 in the axial direction, an intermediate cam 94 engaging with a cam 92 of the cam shaft 70 and slidably fitting with a spline 93 formed on the control rod 90 and extending in the axial direction thereof, and a pivoting cam 96 engaging with a valve lifter 26 for driving the intake valve 7 and slidably fitting with a spline 95 extending in a spiral and formed on the control rod 90. The pivoting cam 96 is formed with a cam 97.

When the cam shaft 70 rotates, the cam 92 causes the intermediate cam 94 to pivot by exactly a constant angle at all times. At this time, the pivoting cam 96 is also made to pivot by exactly a constant angle. On the other hand, the intermediate cam 94 and pivoting cam 96 are supported not movably in the axial direction of the control rod 90, therefore when the control rod 90 is made to move by the actuator 91 in the axial direction, the pivoting cam 96 is made to rotate relative to the intermediate cam 94.

Figure 5B:
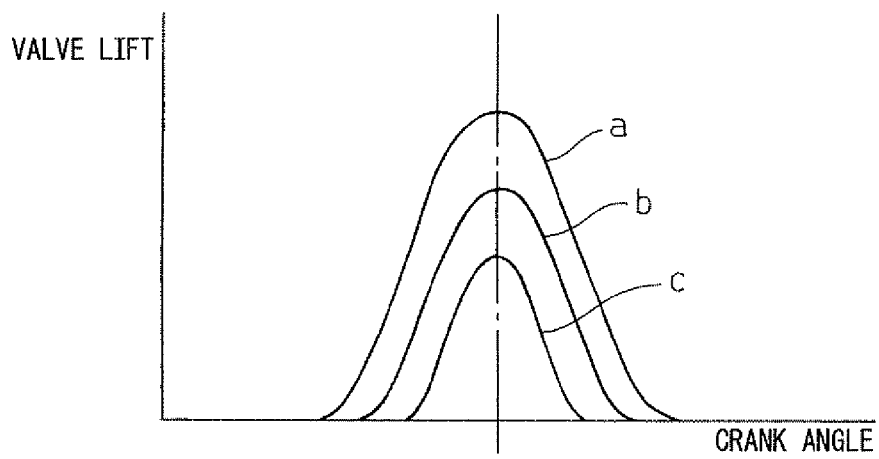

If the cam 97 of the pivoting cam 96 starts to engage the valve lifter 26 when the cam 92 of the cam shaft 70 starts to engage with the intermediate cam 94 due to the relative rotational positional relationship between the intermediate cam 94 and pivoting cam 96, as shown by a. in FIG. 5B, the opening time period and amount of lift of the intake valve 7 become maximum. As opposed to this, when the actuator 91 is used to make the pivoting cam 96 rotate relative to the intermediate cam 94 in the arrow Y-direction of FIG. 4, the cam 92 of the cam shaft 70 engages with the intermediate cam 94, then after a while the cam 97 of the pivoting cam 96 engages with the valve lifter 26. In this case, as shown by b in FIG. 5B, the opening time period and amount of lift of the intake valve 7 become smaller than a.

When the pivoting cam 96 is made to further rotate relative to the intermediate cam 94 in the arrow Y-direction of FIG. 4, as shown by c in FIG. 5B, the opening time period and amount of lift of the intake valve 7 become further smaller. That is, by using the actuator 91 to change the relative rotational position of the intermediate cam 94 and pivoting cam 96, the opening time period of the intake valve 7 can be freely changed. However, in this case, the amount of the lift of the intake valve 7 becomes smaller the shorter the opening time of the intake valve 7.

The cam phase changer B1 can be used to freely change the opening timing of the intake valve 7 and the cam actuation angle changer B2 can be used to freely change the opening time period of the intake valve 7 in this way, so both the cam phase changer B1 and cam actuation angle changer B2, that is, the intake variable valve mechanism B, may be used to freely change the opening timing and opening time period of the intake valve 7, that is, the opening timing and closing timing of the intake valve 7.

Note that the intake variable valve mechanism B shown in FIGS. 1 and 4 shows an example. It is also possible to use various types of variable valve mechanism other than the example shown in FIGS. 1 and 4. Further, the exhaust variable valve mechanism C has a construction similar to that of the intake variable valve mechanism B, and thus can freely change the opening and closing timing of the exhaust valve 9.

Next, the meaning of the terms used in the present application will be explained with reference to FIG. 6A, FIG. 6B, FIG. 7A and FIG. 7B. Note that FIG. 6A, FIG. 6B, FIG. 7A and FIG. 7B show for explanatory purposes an engine with a volume of the combustion chambers of 50 ml and a stroke volume of the piston of 500 ml. In these FIG. 6A, FIG. 6B, FIG. 7A and FIG. 7B, the combustion chamber volume shows the volume of the combustion chamber when the piston is at compression top dead center.

Figure 6A:
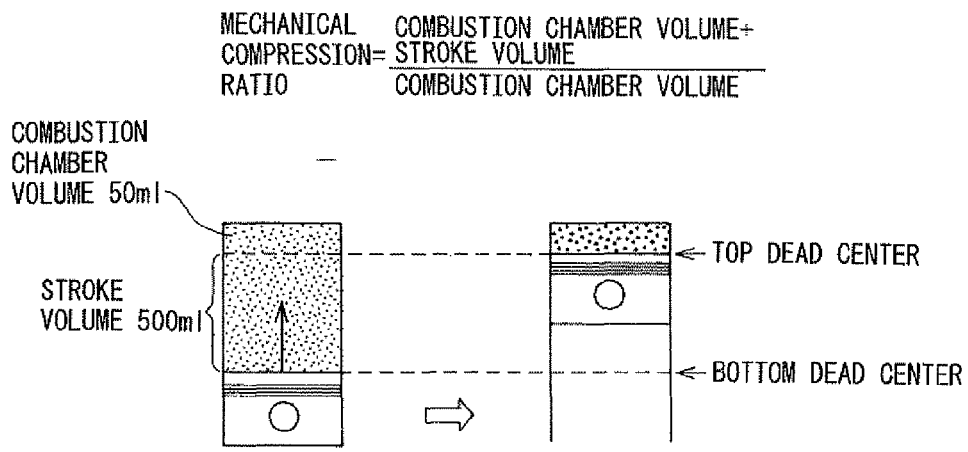
FIG. 6A and FIG. 6B are views explaining a mechanical compression ratio and an actual compression ratio.

FIG. 6A explains the mechanical compression ratio. The mechanical compression ratio is a value determined mechanically from the stroke volume of the piston and combustion chamber volume at the time of a compression stroke. This mechanical compression ratio is expressed by (combustion chamber volumed-stroke volume)/combustion chamber volume. In the example shown in FIG. 6A, this mechanical compression ratio becomes (50 ml+500 ml)/50 ml=11.

Figure 6B:
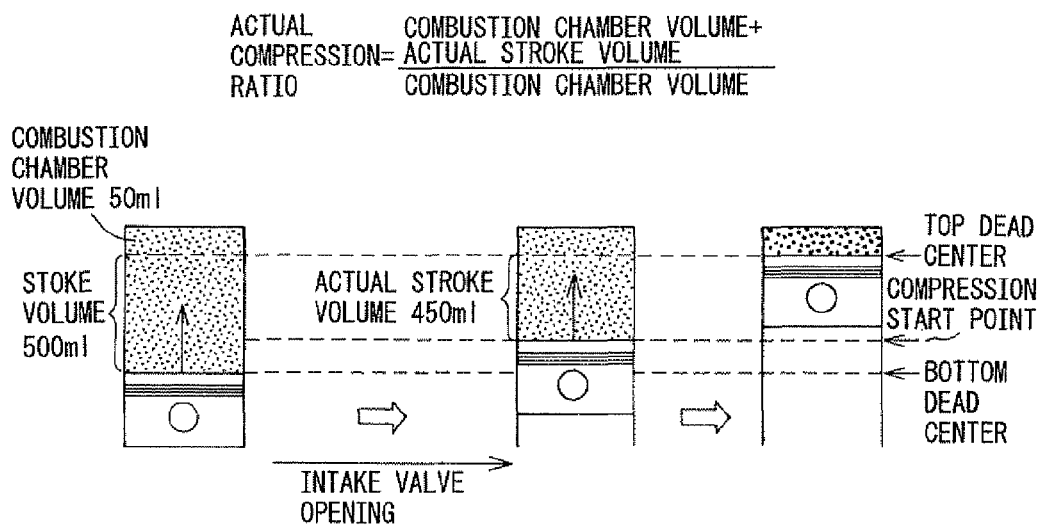

FIG. 6B explains the actual compression ratio. This actual compression ratio is a value determined from the combustion chamber volume and the actual stroke volume of the piston from when the compression action is actually started to when the piston reaches top dead center. This actual compression ratio is expressed by (combustion chamber volume+actual stroke volume)/combustion chamber volume. That is, as shown in FIG. 6B, even if the piston starts to rise in the compression stroke, no compression action is performed while the intake valve is opened. The actual compression action is started after the intake valve closes. Therefore, the actual compression ratio is expressed as above using the actual stroke volume. In the example shown in FIG. 6B, the actual compression ratio becomes (50 ml+450 ml)/50 ml=10.

Figure 7A:
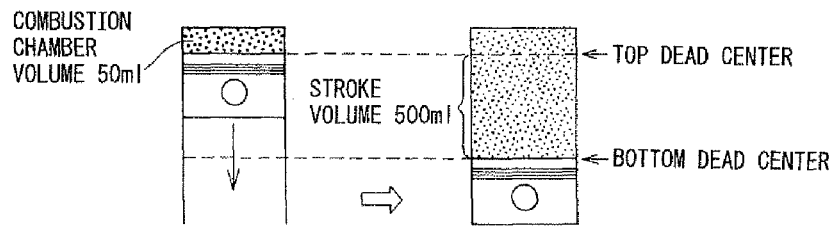
FIG. 7A and FIG. 7B are views explaining a mechanical expansion ratio and an actual expansion ratio.

FIG. 7A explains the mechanical expansion ratio. The mechanical expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 7A, this expansion ratio becomes (50 ml+500 ml)/50 ml=11.

Figure 7B:
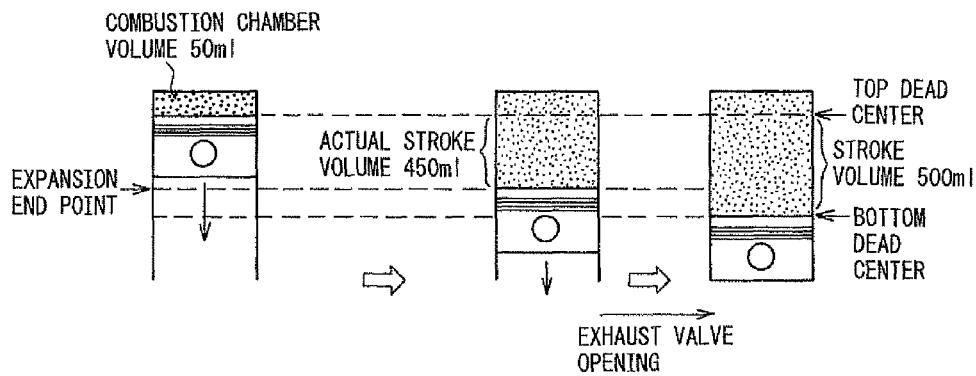

FIG. 7B explains the actual expansion ratio, which actual expansion ratio is a value determined from the combustion chamber volume and the actual stroke volume of the piston from when the piston is at the top dead center to when the expansion action is actually terminated. This actual expansion ratio is expressed by (combustion chamber volume+ actual, stroke volume)/combustion chamber volume. That is, as shown in FIG. 7B, even if the piston is moving downwardly in the expansion stroke, no expansion action is performed after the exhaust valve is opened. The actual expansion action occurs until the exhaust valve starts to open. Therefore, the actual compression ratio is expressed as above using the actual stroke volume. In the example shown in FIG. 7B, the actual expansion ratio becomes (50 ml+450 ml)/50 ml=10.

Figure 8:
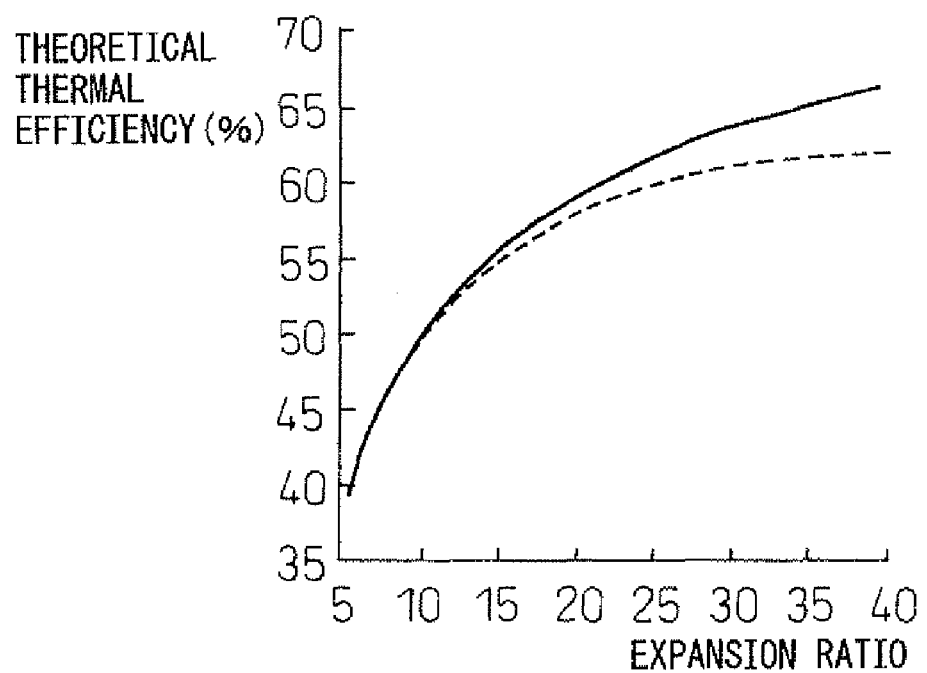
FIG. 8 is a view showing the relationship of the theoretical thermal efficiency and expansion ratio.

Next, the most basic features of the present invention will be explained with reference to FIG. 8, FIG. 9A and FIG. 9B. Note that FIG. 8 shows the relationship between the theoretical thermal efficiency and the expansion ratio, while FIG. 9A and FIG. 9B show a comparison between the ordinary cycle and superhigh expansion ratio cycle used selectively in accordance with the load in the present invention. Note that FIG. 8, FIG. 9A and FIG. 9B show an example when the mechanical expansion ratio is equal to the actual expansion ratio. Therefore, the mechanical expansion ratio and actual expansion ratio are simply referred to as expansion ratio, without distinguishing between the mechanical expansion ratio and actual expansion ratio.

FIG. 9A shows the ordinary cycle wherein the intake valve closes near the bottom dead center and the compression action by the piston is started from near substantially compression bottom dead center. In the example shown in this FIG. 9A as well, in the same way as the examples shown in FIGS. 6A, 6B, 7A and 7B, the combustion chamber volume is made 50 ml, and the stroke volume of the piston is made 500 ml. As will be understood from FIG. 9A, in an ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

The solid line in FIG. 8 shows the change in the theoretical thermal efficiency in the case where the actual compression ratio and expansion ratio are substantially equal, that is, in the ordinary cycle. In this case, it is learned that the larger the expansion ratio, that is, the higher the actual compression ratio, the higher the theoretical thermal efficiency. Therefore, in an ordinary cycle, to raise the theoretical thermal efficiency, the actual compression ratio should be made higher. However, due to the restrictions on the occurrence of knocking at the time of engine high load operation, the actual compression ratio can only be raised even at the maximum to about 12, accordingly, in an ordinary cycle, the theoretical thermal efficiency cannot be made sufficiently high.

On the other hand, under this situation, the inventors strictly differentiated between the mechanical compression ratio and actual compression ratio and studied the theoretical thermal efficiency and as a result discovered that in the theoretical thermal efficiency, the expansion ratio is dominant, and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is made, the higher the theoretical thermal efficiency becomes. The broken line in FIG. 8 shows the theoretical thermal efficiency in the case of fixing the actual compression ratio at 10 and raising the expansion ratio in that state. It is learned that the amount of rise of the theoretical thermal efficiency when raising the expansion ratio in the state where the actual compression ratio is maintained at a low value in the above way and the amount of rise of the theoretical thermal efficiency in the case where the actual compression ratio is increased along with the expansion ratio as shown by the solid line of FIG. 8 will not differ that much.

If the actual compression ratio is maintained at a low value in this way, knocking will not occur, therefore if raising the expansion ratio in the state where the actual compression ratio is maintained at a low value, the occurrence of knocking can be prevented and the theoretical thermal efficiency can be greatly raised. FIG. 9B shows an example of the case when using the variable compression ratio mechanism A and variable valve timing mechanism B to maintain the actual compression ratio at a low value and raise the expansion ratio.

Referring to FIG. 9B, in this example, the variable compression ratio mechanism A is used to lower the combustion chamber volume from 50 ml to 20 ml. On the other hand, the variable valve timing mechanism B is used to retard the closing timing of the intake valve until the actual stroke volume of the piston changes from 500 ml to 200 ml. As a result, in this example, the actual compression ratio becomes (20 ml+200 ml)/20 ml=11 and the expansion ratio becomes (20 ml+500 ml)/20 ml=26. In the ordinary cycle shown in FIG. 9A, as explained above, the actual compression ratio is about 11 and the expansion ratio is 11. Compared with this case, in the case shown in FIG. 9B, it is learned that only the expansion ratio is raised to 26. This is the reason that it is called the "superhigh expansion ratio cycle".

As explained above, generally speaking, in an internal combustion engine, the lower the engine load, the worse the thermal efficiency, therefore to improve the thermal efficiency at the time of vehicle operation, that is, to improve the fuel consumption, it becomes necessary to improve the thermal efficiency at the time of engine low load operation. On the other hand, in the superhigh expansion ratio cycle shown in FIG. 9B, the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 9B is set, while at the time of engine high load operation, the ordinary cycle shown in FIG. 9A is set. This is the basic feature of the present invention.

Figure 10:
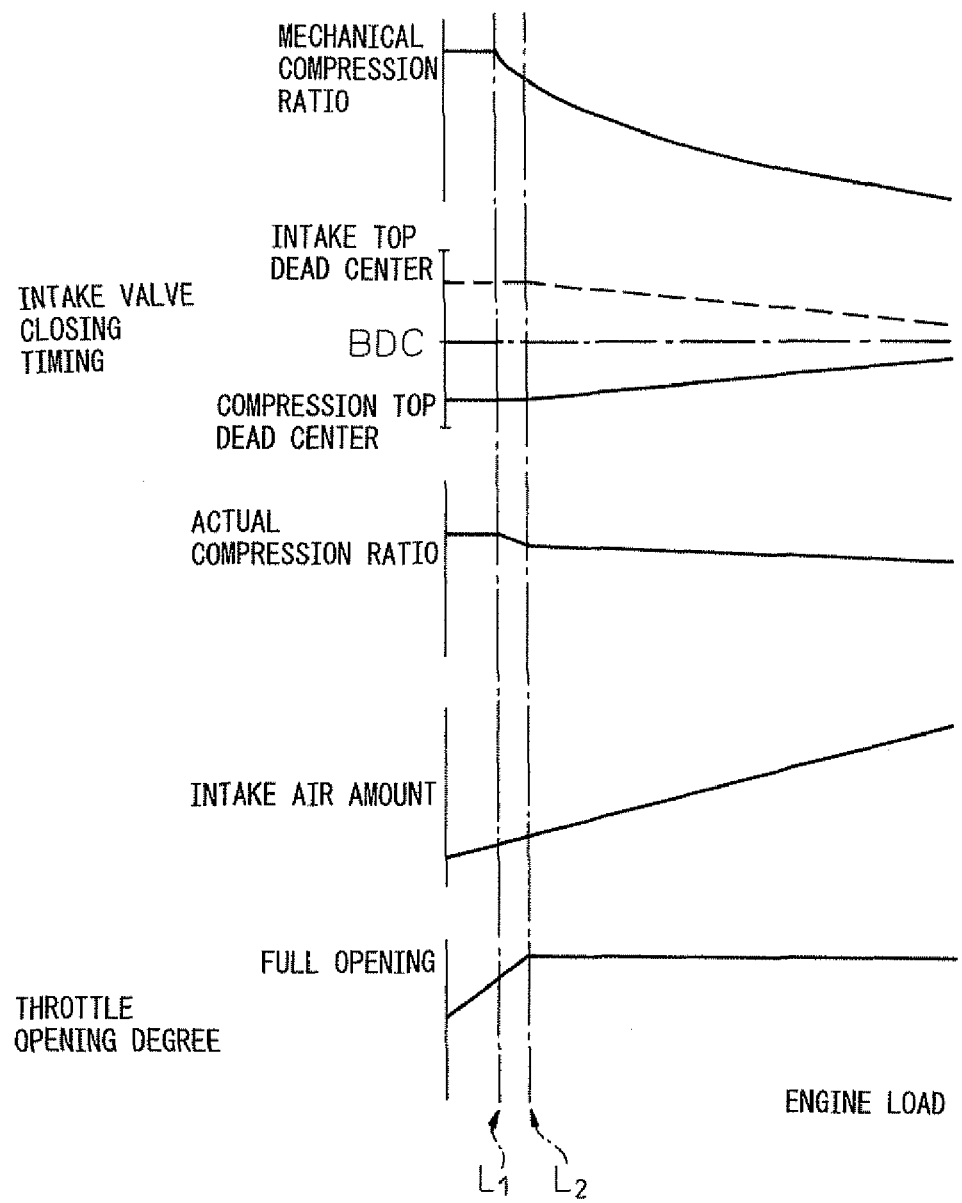
FIG. 10 is a view showing the change in mechanical compression ratio, etc., in accordance with the engine load.
Figure 11:
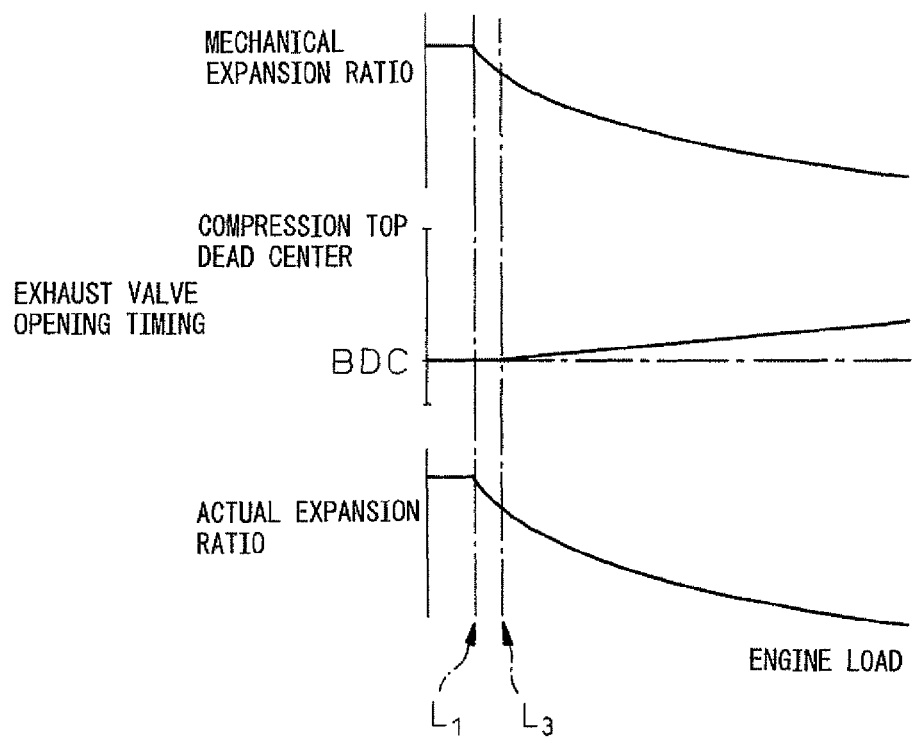
FIG. 11 is a view showing the change in mechanical expansion ratio, etc., in accordance with the engine load.

FIG. 10 and FIG. 11 show the operational control as a whole at the time of steady operation with a low engine speed. Below, the operational control as a whole will be explained with reference to FIG. 10 and FIG. 11.

FIG. 10 shows the changes in the mechanical compression ratio, the closing timing of the intake valve 7, the actual compression ratio, the amount of intake air, and the opening degree of the throttle valve 19 according to the engine load. Note that in the embodiments according to the present invention, to enable the three-way catalyst in the catalytic converter 22 to simultaneously reduce the unburned HC, CO, and $NO_x$ in the exhaust gas, ordinarily the average air-fuel ratio in the combustion chamber 5 is feedback controlled to the stoichiometric air-fuel ratio based on the output signal of the air-fuel ratio sensor 23.

As explained above, at the time of engine high load operation, the ordinary cycle shown in FIG. 9A is executed. Therefore, as shown in FIG. 10, at this time, the mechanical compression ratio is made low and, as shown by the solid line in FIG. 10, the closing timing of the intake valve 7 is advanced. Further, at this time, the opening degree of the throttle valve 19 is maintained fully opened or substantially fully opened.

On the other hand, as shown in FIG. 10, along with the reduction in the engine load, the mechanical compression ratio is increased. Further, if the engine load drops, the amount of air to be filled in the combustion chamber 5 (target intake air amount) will also drop, so the closing timing of the intake valve 7 is retarded with it (solid line of FIG. 10). Note that, at this time as well, the throttle valve 19 is held at the fully opened or substantially fully opened state, therefore the amount of air fed to the combustion chamber 5 is controlled not by the throttle valve 19 but by changing the closing timing of the intake valve 7.

At this time, the closing timing of the intake valve 7 is retarded proportionally to the engine load, while the mechanical compression ratio is increased not proportionally to the engine load. That is, the volume of the combustion chamber 5 when the piston 4 reaches compression top dead center is not proportional to the amount of intake air. Therefore, in almost all cases, the actual compression ratio does not remain constant regardless of the engine load, but changes in accordance with the engine load. In the present embodiment, as shown in FIG. 10, the actual compression ratio is increased as the engine load falls.

If the engine load falls further, the mechanical compression ratio is further increased. When the mechanical compression ratio reaches the limit mechanical compression ratio forming the structural limit of the combustion chamber 5, in the region of a load lower than the engine load L1 (reference load) when the mechanical compression ratio reaches the limit mechanical compression ratio, the mechanical compression ratio is held at the limit mechanical compression ratio. Therefore at the time of engine low load operation, the mechanical compression ratio becomes maximum. Putting this another way, in the present invention, so as to obtain the maximum expansion ratio at the time of engine low load operation, the mechanical compression ratio is made maximum. Further, at this time, the actual compression ratio is maintained at an actual compression ratio substantially the same as that at the time of engine medium and high load operation.

On the other hand, as shown by the solid line in FIG. 10, the closing timing of the intake valve 7 is retarded further to the limit closing timing enabling control of the amount of intake air fed to the combustion chamber 5 the more the engine load becomes lower. In the region of a load lower than the engine load L2 when the closing timing of the intake valve 7 reaches the limit closing timing, the closing timing of the intake valve 7 is held at the limit closing timing. If the closing timing of the intake valve 7 is held at the limit closing timing, the amount of intake air will no longer be able to be controlled by the change of the closing timing of the intake valve 7. Therefore, the amount of intake air has to be controlled by some other method.

In the embodiment shown in FIG. 10, at this time, that is, in the region of a load lower than the engine load L2 when the closing timing of the intake valve 7 reaches the limit closing timing, the throttle valve 19 is used to control the amount of intake air fed to the combustion chamber 5.

Note that, as explained above, in the superhigh expansion ratio cycle shown in FIG. 9B, the expansion ratio is made 26. The higher this expansion ratio, the better, but if 20 or more, a considerably high theoretical thermal efficiency can be obtained. Therefore, in the present invention, the variable compression ratio mechanism A is formed so that the expansion ratio becomes 20 or more.

Further, in the example shown in FIG. 10, the mechanical compression ratio is changed continuously in accordance with the engine load. However, the mechanical compression ratio can also be changed in stages in accordance with the engine load.

On the other hand, as shown by the broken line in FIG. 10, as the engine load becomes lower, by advancing the closing timing of the intake valve 7 as well, it is possible to control the amount of intake air without depending on the throttle valve. Therefore, in FIG. 10, if comprehensively expressing both the case shown by the solid line and the case shown by the broken line, in the embodiment according to the present invention, the closing timing of the intake valve 7 is shifted as the engine load becomes lower in a direction away from compression bottom dead center BDC until the limit closing timing L2 enabling control of the amount of intake air fed into the combustion chamber 5.

FIG. 11 shows the changes in the mechanical expansion ratio, opening timing of the exhaust valve 9, and actual expansion ratio according to the engine load.

As is clear from FIG. 6A, FIG. 6B, FIG. 7A and FIG. 7B, the mechanical expansion ratio is identical to the mechanical compression ratio. Therefore, at the time of engine high load operation, if the ordinary cycle shown in FIG. 9A is executed, the mechanical expansion ratio as shown in FIG. 11 drops, further, the opening timing of the exhaust valve 9 advances. Therefore, because the opening timing of the exhaust valve 9 advances, even if combustion generates a large amount of exhaust gas in the combustion chamber 5, exhaust gas can quickly be ejected from the inside of the combustion chamber 5.

On the other hand, as shown in FIG. 11, along with the reduction in the engine load, the mechanical expansion ratio is increased. Further, if the engine load drops, the amount of exhaust gas to be generated in the combustion chamber 5 by combustion will also drop, so the opening timing of the exhaust valve 9 is retarded with it. Therefore, along with the reduction in the engine load, the combustion chamber volume in FIG. 7B becomes smaller and the actual stroke volume increases, so the actual expansion ratio is increased.

If the engine load becomes further lower and the mechanical expansion ratio reaches the limit mechanical expansion ratio (equivalent to the limit mechanical compression ratio), the mechanical compression ratio is held at the limit mechanical compression ratio. On the other hand, the opening timing of the exhaust valve 9 is retarded further to the timing that the energy of the combustion gas can be maximally transmitted to the piston which is the exhaust bottom dead center BDC or near the exhaust bottom dead center BDC (hereinafter, simply referred to as exhaust bottom dead center BDC vicinity) the more the engine load becomes lower. In the region of a load lower than the engine load L3 when the opening timing of the exhaust valve 9 reaches the exhaust bottom dead enter BDC vicinity, the opening timing of the exhaust valve 9 is held at the exhaust bottom dead center BDC vicinity.

Figure 12A:
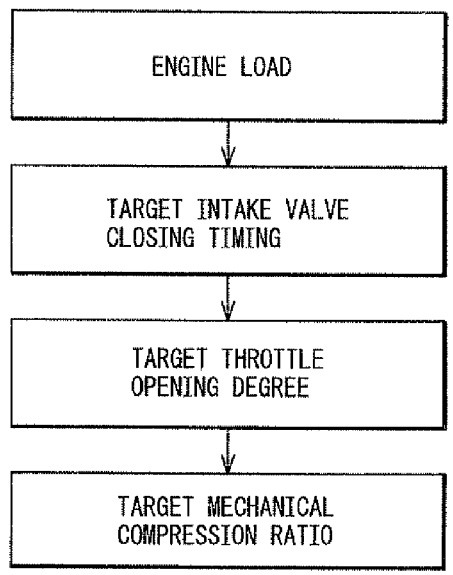
FIG. 12A and FIG. 12B are views explaining the steps for setting mechanical expansion ratio etc.
Figure 12B:
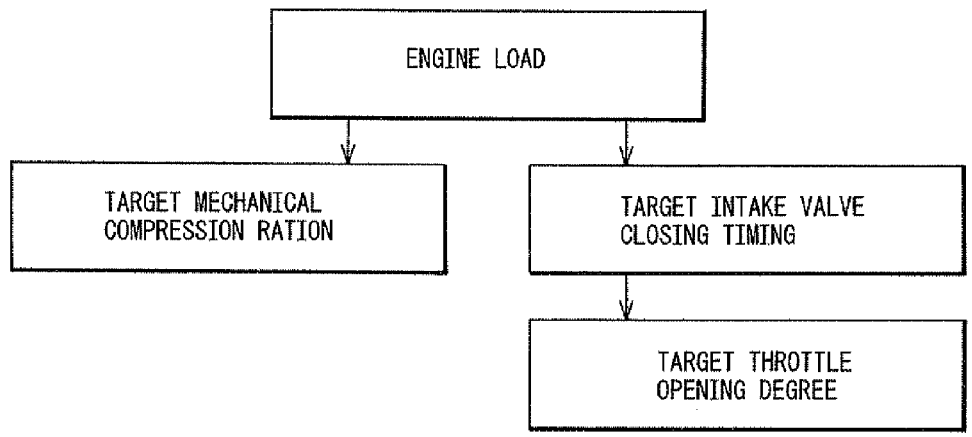

FIG. 12A and FIG. 12B show the steps for setting the target values of the mechanical expansion ratio, closing timing of the intake valve 7, etc. Below, referring to FIG. 12A and FIG. 12B, the steps for setting the target values of these parameters will be explained.

FIG. 12A shows the conventional steps for setting the mechanical compression ratio and the closing timing of the intake valve so as to make the actual compression ratio constant. As is clear from FIG. 12A, primarily, the target closing timing of the intake valve is set based on the engine load. This is because the amount of air to be sucked (target intake air amount) in the combustion chamber is determined according to the engine load, so the target closing timing of the intake valve is set so that the actual amount of intake air becomes the target intake air amount. Then, the target mechanical compression ratio is set based on the target closing timing of the intake valve and the target actual compression ratio (the above constant actual compression ratio).

On the other hand, FIG. 12B shows the procedure for setting the mechanical compression ratio and the closing timing of the intake valve 7 in an embodiment of the present invention. As is clear from FIG. 12B, in the procedure for setting the ratio in the embodiment of the present invention, the target mechanical compression ratio is set so that the thermal efficiency becomes maximized based only on the engine load. The target closing timing of the intake valve is set based on the engine load similarly to the above conventional setting routine. Accordingly, the target mechanical compression ratio and target closing timing of the intake valve are set based on the engine load but unrelated to the other's setting value. If the target closing timing of the intake valve is set, this setting value and the engine load are used to set the target throttle opening degree. Therefore, when it is judged that the intake air amount cannot be appropriately controlled with only the closing timing of the intake valve, the intake air amount can be made appropriate by regulating the throttle opening degree.

When the target mechanical compression ratio is set as shown in FIG. 12A, the actual compression ratio can be made constant, but the mechanical compression ratio cannot be made an optimum value with respect to the thermal efficiency, so the thermal efficiency cannot be maximized. As opposed to this, according to an embodiment of the present invention, the target mechanical compression ratio is set based on only the engine load so that the thermal efficiency is maximized, so the thermal efficiency can be made high.

Further, in an embodiment of the present invention, the target opening timing of the exhaust valve 9 is set based on the load or the intake air amount. Here, the thermal efficiency of the internal combustion engine becomes higher the higher the actual expansion ratio as shown in FIG. 8, so from the viewpoint of thermal efficiency, setting the target opening timing of the exhaust valve 9 to the exhaust bottom dead center BDC vicinity is preferable. On the other hand, if the opening timing of the exhaust valve 9 is retarded, discharge of the exhaust gas in the combustion chamber 5 becomes difficult, so from the viewpoint of ease of discharge of exhaust gas, advancing the opening timing of the exhaust valve 9 is preferable. In particular, discharge of exhaust gas becomes an issue when the amount of intake air is large, that is, at the time of engine high load operation, so in the embodiment of the present invention, when the engine load is high, the opening timing of the exhaust valve 9 is advanced, while when the engine load is low, the opening timing of the exhaust valve 9 is set to the exhaust bottom dead center BDC vicinity so as to increase the actual expansion ratio. Due to this, according to the embodiment of the present invention, the engine output at the time of engine high load operation can be made sufficient while the thermal efficiency can be improved.

FIG. 13 is a flowchart showing the control routine of the operational control of the internal combustion engine in the present embodiment. The control routine shown in FIG. 13 is executed by interruption every predetermined period.

Referring to FIG. 13, first, at step S11, a load sensor 41 detects a required load. Next, at step S12, it is judged if the required load detected at step S11 has changed from the previous required load. At step S11, when it is judged that the required load has not changed, the routine proceeds to step S17. On the other hand, when it is judged that the required load has changed, the routine proceeds to step S13.

Figure 14A:
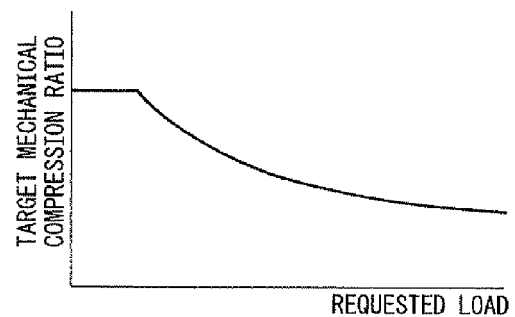
FIG. 14A to FIG. 14D are views showing maps for calculating target mechanical compression ratios etc.
Figure 14B:
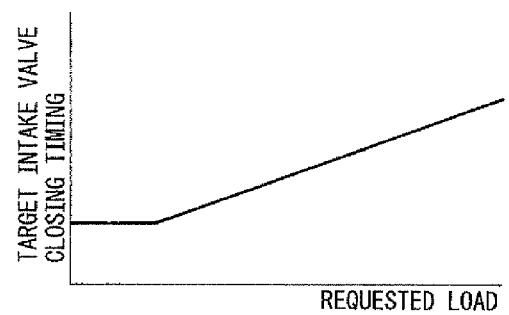
Figure 14C:
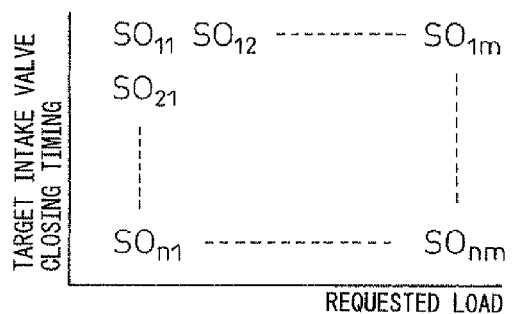
Figure 14D:
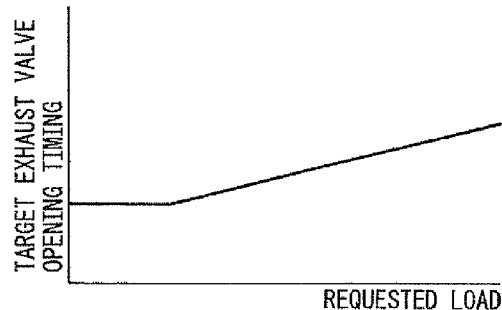

Next, at step S13, the target mechanical compression ratio is calculated based on the required load detected at step S11 and the map shown in FIG. 14A. Next, at step S14, the target closing timing of the intake valve 7 is calculated based on the detected required load and the map shown in FIG. 14B. Then, at step S15, the target throttle opening degree is calculated based on the detected required load, the target closing timing of the intake valve 7 calculated at step S14, and the map shown in FIG. 14C. At step S16, the target opening timing of the exhaust valve 9 is calculated based on the required load and the map shown in FIG. 14D, then the routine proceeds to step S17.

At step S17, it is judged by a knock sensor (not shown) if knocking occurs in the combustion chamber 5. When it is judged that knocking occurs, the routine proceeds to step S18. At step S18, the ignition timing by the spark plug 6 is retarded by a specified angle and the control routine ends. On the other hand, when it is judged that knocking has not occurred, step S18 is skipped and the control routine ends.

Note that, the present invention was explained with specific embodiments, however, persons skilled in the art may make various modifications and corrections without straying from the scope of the claims and gist of the present invention.

LIST OF REFERENCE NUMERALS

1 . . . crank case
2 . . . cylinder block
3 . . . cylinder head
4 . . . piston
5 . . . combustion chamber
7 . . . intake valve
9 . . . exhaust valve 19 . . . throttle valve
A . . . variable compression ratio mechanism
B . . . intake variable valve mechanism
C . . . exhaust variable valve mechanism

The invention claimed is:

1. A spark ignition type internal combustion engine comprising:
   a variable expansion ratio mechanism that is configured to change a mechanical expansion ratio;
   an exhaust variable valve mechanism that is configured to change an opening timing of an exhaust valve; and
   an electronic control unit that is configured to set the mechanical expansion ratio and the opening timing of the exhaust valve according to an engine load so that, as the engine load becomes lower, the mechanical expansion ratio becomes higher and the opening timing of the exhaust valve becomes more retarded to an exhaust bottom dead center side.

2. A spark ignition type internal combustion engine as set forth in claim 1, wherein the variable expansion ratio mechanism is configured so that a maximum value of the mechanical expansion ratio is 20 or more.

3. A spark ignition type internal combustion engine as set forth in claim 1, wherein when the actual load is less than a reference load, the electronic control unit controls the mechanical expansion ratio to be substantially constant.

4. A spark ignition type internal combustion engine as set forth in claim 3, wherein the reference load is the engine load when the electronic control unit changes the mechanical expansion ratio to maximum.

5. A spark ignition type internal combustion engine as set forth in claim 1, further comprising an intake variable valve mechanism configured to change a closing timing of an intake valve and configured to move the closing timing of the intake valve further in the direction away from the intake bottom dead center the less the engine load.

6. A spark ignition type internal combustion engine as set forth in claim 1, wherein the electronic control unit retards an ignition timing when knocking occurs.

* * * * *